(12) United States Patent
Round

(10) Patent No.: US 12,332,045 B2
(45) Date of Patent: Jun. 17, 2025

(54) METHOD FOR DETERMINING A MATERIAL PROPERTY OF AN OBJECT

(71) Applicant: M-XR LIMITED, Milton Keynes (GB)

(72) Inventor: Elliott Paul Edward Round, Milton Keynes (GB)

(73) Assignee: M-XR LIMITED (GB)

( * ) Notice: Subject to any disclaimer, the term of this patent is extended or adjusted under 35 U.S.C. 154(b) by 367 days.

(21) Appl. No.: 17/775,000

(22) PCT Filed: Nov. 6, 2020

(86) PCT No.: PCT/EP2020/081316
§ 371 (c)(1),
(2) Date: May 6, 2022

(87) PCT Pub. No.: WO2021/089795
PCT Pub. Date: May 14, 2021

(65) Prior Publication Data
US 2022/0381558 A1    Dec. 1, 2022

(30) Foreign Application Priority Data
Nov. 8, 2019 (EP) .................................. 19208011

(51) Int. Cl.
*G01B 11/30* (2006.01)
*G06T 15/50* (2011.01)
(52) U.S. Cl.
CPC .......... *G01B 11/303* (2013.01); *G06T 15/506* (2013.01)

(58) Field of Classification Search
CPC .............................. G01B 11/303; G06T 15/506
USPC ............................................................ 356/600
See application file for complete search history.

(56) References Cited

U.S. PATENT DOCUMENTS

| 10,235,797 B1 * | 3/2019 | Sheffield ............... G06T 15/205 |
| 2015/0161816 A1 * | 6/2015 | Grenfell ................. G06T 15/80 345/426 |
| 2018/0023947 A1 | 1/2018 | Meng et al. |
| 2018/0047208 A1 | 2/2018 | Marin et al. |
| 2019/0287237 A1 | 9/2019 | de Bonfim Gripp et al. |
| 2020/0041264 A1 * | 2/2020 | Bilodeau ................. G01N 21/85 |

OTHER PUBLICATIONS

Chen, G. et al., "PS-FCN: A Flexible Learning Framework for Photometric Stereo," 12th European Conference on Computer Vision (ECCV), Sep. 2018. pp. 1-16. XP055691006.
(Continued)

*Primary Examiner* — Mohamed K Amara
*Assistant Examiner* — Omar H Nixon
(74) *Attorney, Agent, or Firm* — Lerner David LLP

(57) ABSTRACT

A method of determining a material property of an object. The method comprises: obtaining a real light intensity value for each of a first number of light source positions and each of a second number of light sensor positions, the real light intensity value indicating an intensity of light from the light source position that is reflected or diffused by an object to the light sensor position; determining a three-dimensional surface of the object; and for each of a plurality of points on the three-dimensional surface of the object, using a model that has been trained by machine learning, predicting the material property for the object at the point based on the obtained real light intensity values.

15 Claims, 11 Drawing Sheets

(56) References Cited

OTHER PUBLICATIONS

Deschaintre, V. et al., "Flexible SVBRDF Capture with a Multi-Image Deep Network," Eurographics Symposium on Rendering, Jun. 2019, pp. 1-14, vol. 38, No. 4. XP081384915.
International Search Report including Written Opinion for Application No. PCT/EP2020/081316 mailed Jan. 28, 2021, pp. 1-16.

* cited by examiner

A  B

C  D

METHOD FOR DETERMINING A MATERIAL PROPERTY OF AN OBJECT

CROSS REFERENCE TO RELATED APPLICATIONS

The present application is a national phase entry under 35 U.S.C. § 371 of International Application No. PCT/EP2020/081316, filed Nov. 6, 2020, published in English, which claims the benefit of and priority to European Patent Application No. 19208011.7, filed Nov. 8, 2019, the entire disclosures of which are incorporated by reference herein.

TECHNICAL FIELD

The present disclosure relates to three-dimensional (3D) virtual representation of real-world objects. The present disclosure also relates to determining a material property of an object.

BACKGROUND

Three-dimensional models of real-world objects are used for a variety of purposes including generating assets for video games, and demonstrating products on shopping websites. In such contexts, the real-world object is viewed from a variety of angles and may be viewed under different lighting conditions.

A key concern in three-dimensional modelling is the so-called "uncanny valley" in which the 3D model of an object looks to some degree realistic, but can nevertheless be distinguished from the real-world object.

The level of realism of a 3D model is typically limited by the size of the dataset used to generate the model. More specifically, in order to generate a 3D model of a real-world object, imaging is performed from a variety of angles with one or more cameras and one or more light sources. This dataset is then used to construct a 3D model of the object and rendered for a given virtual position relative to a viewpoint and a light source. For example, the 3D model often comprises a UV map of a 2D image of the model's surface onto the geometry of the model.

Raising the level of realism of a 3D model of a real-world object beyond the "uncanny valley" typically requires a very large dataset and can only be obtained using an expensive camera and lighting system, with high spatial resolution in terms of the positions of the camera(s) and the positions of the light source(s).

Accordingly, it is desirable to provide a way of generating a three-dimensional model of an object, with high realism, but from a relatively small dataset.

SUMMARY

According to a first aspect, the present disclosure provides a method of determining a material property of an object, the method comprising:
  obtaining a real light intensity value for each of a first number of light source positions and each of a second number of light sensor positions, the real light intensity value indicating an intensity of light from the light source position that is reflected or diffused by an object to the light sensor position; and
  using a model that has been trained by machine learning, predicting the material property for the object based on the obtained real light intensity values.
Optionally, the method further comprises:
  using a renderer to simulate how light interacts with a plurality of surfaces each having a respective predetermined value of the material property and to generate a plurality of respective samples,
  wherein each sample comprises the predetermined value of the material property and a simulated light intensity value for each of a plurality of sample light source positions and sample light sensor positions relative to the surface, the simulated light intensity value indicating an intensity of light from the light source position that is reflected or diffused by the surface to the light sensor position;
  using the plurality of samples and a machine learning algorithm to train the model to predict the material property when given a light intensity value for each of a first threshold number of light source positions and a second threshold number of light sensor positions, wherein the first number is greater than or equal to the first threshold number and the second number is greater than or equal to the second threshold number.

Optionally, the material property comprises a plurality of channels, each channel being associated with a respective way in which a surface can interact with light, and training the model comprises:
  a first stage of training the model to predict each of the plurality of channels individually, when the rest of the channels of the material property are known; and
  a final stage of training the model to predict all of the plurality of channels, when none of the channels are known.

Optionally, training the model further comprises:
  a second stage, between the first stage and the final stage, of training the model to predict a first channel and a second channel, when the plurality of channels other than the first and second channels are known, wherein the second channel is partly dependent upon the first channel.

Optionally, training the model comprises training the model to predict an orientation of a surface.

Optionally, the method further comprises:
  determining a three-dimensional surface of the object; and
  for each of a plurality of points on the three-dimensional surface of the object, predicting a value of the material property at the point.

Optionally, determining the three-dimensional surface of the object is performed using the model and the obtained real light intensity values.

Optionally, determining a three-dimensional surface of the object comprises, for a first light source position:
  selecting, from the obtained real light intensity values, real light intensity values associated with the first light source position and a plurality of light sensor positions;
  identifying a location of peak specular reflection associated with the first light source position, using the selected real light intensity values associated with the plurality of positions of a light sensor; and
  using the model to identify a position and surface normal of a point on the three-dimensional surface of the object.

Optionally, the method further comprises generating a three-dimensional model of the object, using the predicted material property.

Optionally, the material property comprises one or more of: specular reflection; roughness; diffuse light emission; sub-surface scattering; transparency; and index of refraction.

According to a second aspect, the present disclosure provides a physical scanning system comprising:

a housing for receiving an object to be scanned;

a light source at each of a plurality of light source positions around the housing; and a light sensor at each of a plurality of light sensor positions around the housing.

Optionally, the light sources are polarised light sources, each of the light sensors comprises a sensor polarisation filter with a first polarisation, and each of the light sensors is configured to obtain a reflected light intensity value using the sensor polarisation filter.

Optionally, each of the light sensors is further configured to:

obtain a diffused light intensity value by sensing a second polarisation different from the first polarisation, or obtain a total light intensity value without using the sensor polarisation filter.

Optionally:

the sensor polarisation filter of each light sensor is configured to filter a polarisation that is different from the other light sensors, the polarised light sources each comprise an adjustable source polarisation filter, and the physical scanning system is configured to obtain the polarised light intensity value for a light source and a light sensor by adjusting the adjustable source polarisation filter of the light source to transmit light with a polarisation corresponding to the sensor polarisation filter of the light sensor.

According to a third aspect, the present disclosure provides a processing apparatus configured to perform a method as described above.

According to a fourth aspect, the present disclosure provides a system comprising a processing apparatus configured to perform a method as described above and a physical scanning system as described above.

According to a fifth aspect, the present disclosure provides a computer program comprising instructions which, when executed by a processor, cause the processor to perform a method as described above.

According to a sixth aspect, the present disclosure provides a non-transitory storage medium storing instructions which, when executed by a processor, cause the processor to perform a method as described above.

According to a seventh aspect, the present disclosure provides a signal comprising instructions which, when executed by a processor, cause the processor to perform a method as described above.

According to an eighth aspect, the present disclosure provides a non-transitory storage medium storing a model trained by:

using a renderer to simulate how light interacts with a plurality of surfaces each having a respective predetermined value of the material property and to generate a plurality of respective samples, wherein each sample comprises the predetermined value of the material property and a simulated light intensity value for each of a plurality of sample light source positions and sample light sensor positions relative to the surface, the simulated light intensity value indicating an intensity of light from the light source position that is reflected or diffused by the surface to the light sensor position;

using the plurality of samples and a machine learning algorithm to train the model to predict the material property when given a light intensity value for each of a first threshold number of light source positions and a second threshold number of light sensor positions, wherein the first number is greater than or equal to the first threshold number and the second number is greater than or equal to the second threshold number.

Optionally, the material property comprises a plurality of channels, each channel being associated with a respective way in which a surface can interact with light, and the model is trained by:

a first stage of training the model to predict each of the plurality of channels individually, when the rest of the channels of the material property are known; and a final stage of training the model to predict all of the plurality of channels, when none of the channels are known.

Optionally, the model is further trained by:

a second stage, between the first stage and the final stage, of training the model to predict a first channel and a second channel, when the plurality of channels other than the first and second channels are known, wherein the second channel is partly dependent upon the first channel.

Optionally, the model is further trained to predict an orientation of a surface.

According to a ninth aspect, the present disclosure provides a signal comprising a model trained by:

using a renderer to simulate how light interacts with a plurality of surfaces each having a respective predetermined value of the material property and to generate a plurality of respective samples, wherein each sample comprises the predetermined value of the material property and a simulated light intensity value for each of a plurality of sample light source positions and sample light sensor positions relative to the surface, the simulated light intensity value indicating an intensity of light from the light source position that is reflected or diffused by the surface to the light sensor position;

using the plurality of samples and a machine learning algorithm to train the model to predict the material property when given a light intensity value for each of a first threshold number of light source positions and a second threshold number of light sensor positions, wherein the first number is greater than or equal to the first threshold number and the second number is greater than or equal to the second threshold number.

Optionally, the material property comprises a plurality of channels, each channel being associated with a respective way in which a surface can interact with light, and the model is trained by:

a first stage of training the model to predict each of the plurality of channels individually, when the rest of the channels of the material property are known; and a final stage of training the model to predict all of the plurality of channels, when none of the channels are known.

Optionally, the model is further trained by:

a second stage, between the first stage and the final stage, of training the model to predict a first channel and a second channel, when the plurality of channels other than the first and second channels are known, wherein the second channel is partly dependent upon the first channel.

Optionally, the model is further trained to predict an orientation of a surface.

DETAILED DESCRIPTION

Firstly we describe a physical scanning system in order to define the light interaction principles upon which the invention is based.

Figure 1:
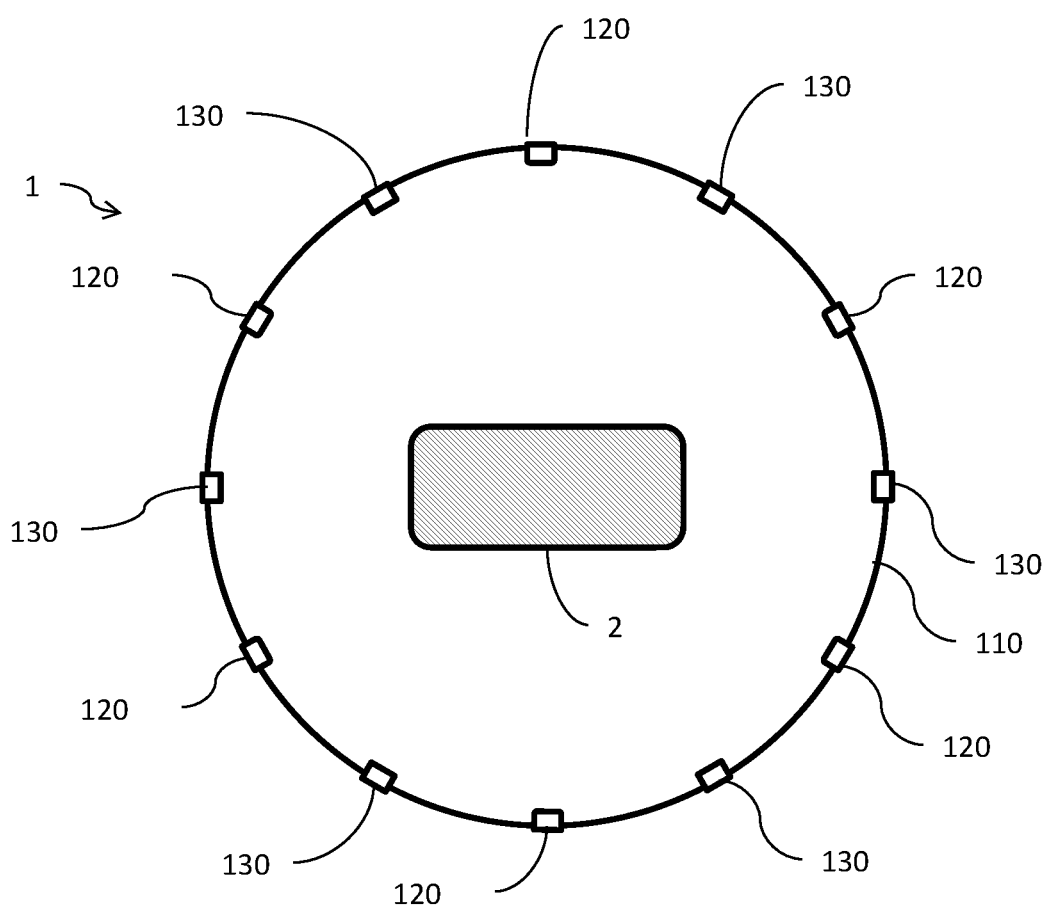
FIG. 1 is a schematic illustration of a physical scanning system.

FIG. 1 is a schematic illustration of a physical scanning system 1. The physical scanning system comprises a housing 110 for receiving an object 2 to be scanned. The object may be anything for which a 3D model might be desired for visualizing the object, with one example being consumer products such as shoes and clothes.

The physical scanning system comprises a light source at each of a plurality of light source positions around the housing, and a light sensor at each of a plurality of light sensor positions around the housing.

Each of the light sources may be controlled independently to illuminate the object from different directions and with different intensities, and each of the light sensors may be used to detect light reflected or diffused by the object. Each of the light sources may, for example, comprise an LED or a laser. Each of the light sensors may, for example, comprise an individual photovoltaic cell or a CCD comprising a pixel array. The light sources and light sensors may be adapted respectively to produce and detect multiple light frequencies independently.

Although the light source positions and light sensor positions are shown separately in FIG. 1, one or more positions may comprise both of a light source and light sensor. For example, a single device may be configured to act as a light source at a first time and a light sensor at a second time.

Although FIG. 1 illustrates a physical scanning system in two dimensions, with light source positions and light sensor positions arranged on the surface of a circle, this is a simplification for pedagogical purposes. The physical scanning system may comprise a three-dimensional arrangement of light source positions and light sensor positions, and each position may be at a same or different distance from the object 2. Accordingly, each light source position and each light sensor position may be defined using up to five dimensions, to define a position and direction of the light source or light sensor in 3D space.

The housing 110 can be any structure that can support the light sources 120 and light sensors 130 with a sufficient internal volume to contain the object 2. Preferably, the housing is sized such that the object occupies a significant but small part of the internal volume, for example between 1% and 25% of the internal volume. This allows light to be reflected between the light sources and the light sensors with significant spatial resolution across the surface of the object.

The following described methods can be performed using inputs from such a physical scanning system. However, this is not essential. For example, instead of the above described physical scanning system, a single light source and a single light sensor may be positioned around the object 2, and moved between different respective positions. Furthermore, the one or more light sources and light sensors may be moved between different positions either manually or using an actuator or motor.

This specification primarily considers two ways in which light can interact with an object surface: light can be reflected at around a single angle (herein simply called 'reflection', but also known as specular reflection), or can be diffused at many angles (herein simply called 'diffusion' but also known as diffuse reflection). In the case of reflection, the polarisation of reflected light is preserved. On the other hand, in the case of diffusion, the polarisation of diffused light is uniformly random.

The spatial distribution and intensity of reflected or diffused light is affected by many properties of a surface. For example, coloured surfaces reflect or diffuse light frequencies associated with their colour with greater intensity than other visible light frequencies.

Figure 2A:
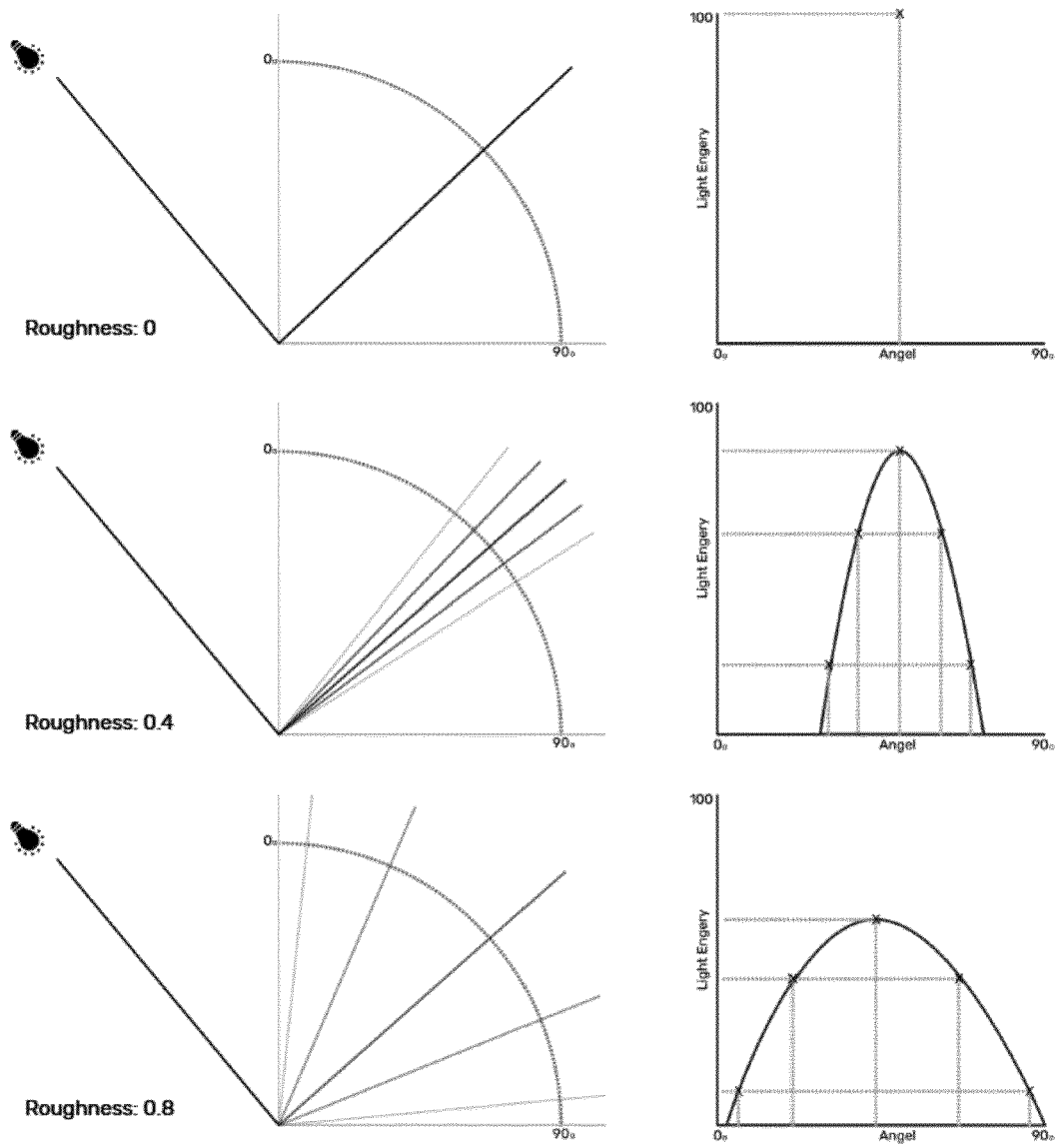
FIGS. 2a and 2b schematically illustrate properties which can affect the distribution of light reflected or diffused from a surface.

As another example, referring to FIG. 2A, it can be seen that the greater the roughness of a surface, the wider the range of angles at which reflection occurs. More specifically, in each diagram of FIG. 2A, light is produced from a fixed angle relative to a surface, and a distribution of reflected light is shown. In the top diagram, with a relative roughness value of 0, the reflected light has all of its energy at a single angle relative to the surface. In the middle diagram, with a relative roughness of 0.4, while the angle of peak reflected light is the same as in the top diagram, the reflected light has energy spread over a narrow angle range. Finally, in the bottom diagram, with a relative roughness of 0.8, the reflected light has energy spread over a wide angle range.

Figure 2B:
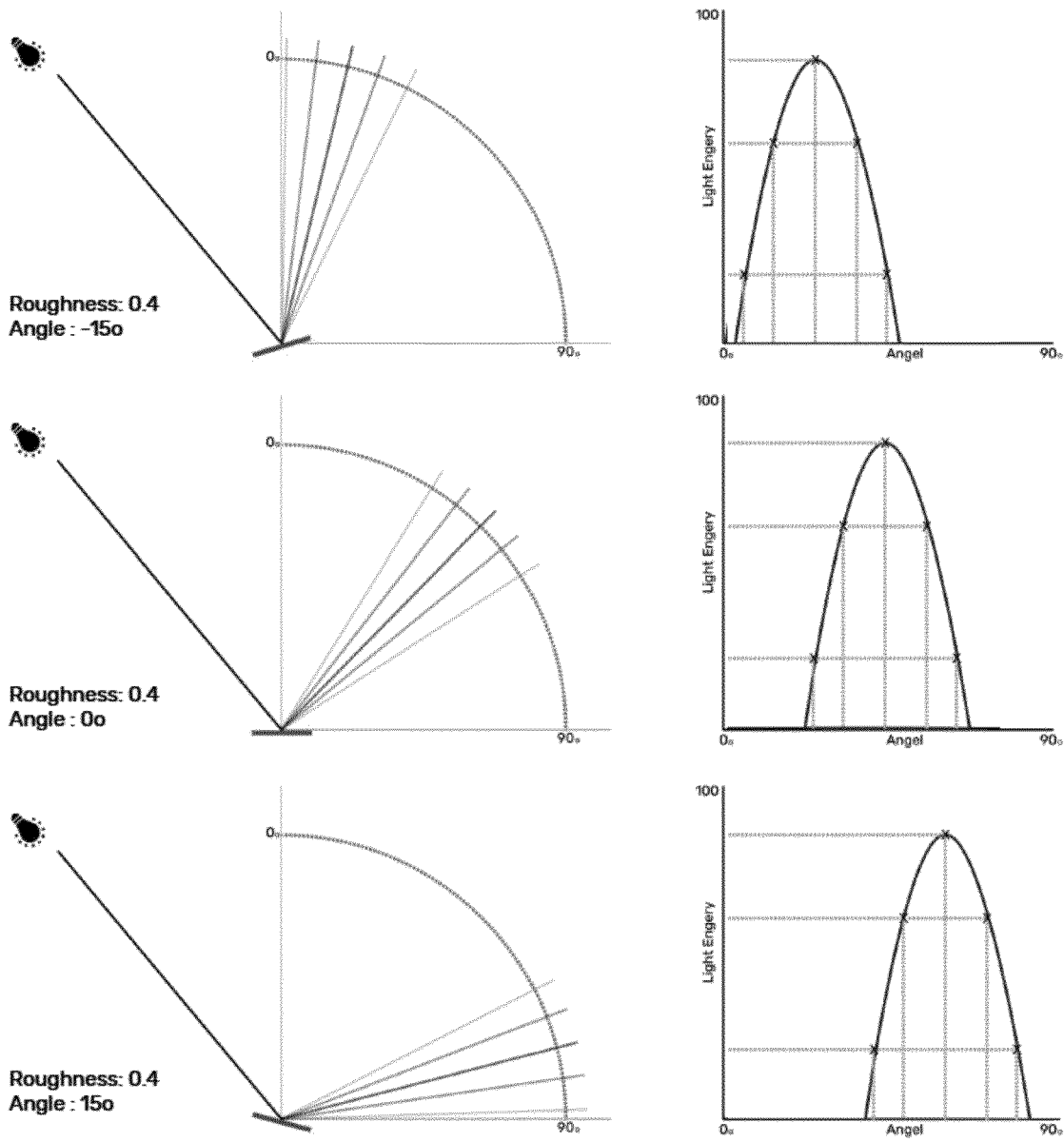

As a further example, referring to FIG. 2B, it can be seen that a central direction of reflection by a surface is dependent upon a surface normal direction of the surface. In each diagram of FIG. 2B, a surface has a fixed relative roughness of 0.4, a surface normal of the surface is varied relative to a light source, and a distribution of reflected light is shown. In the top diagram, the surface normal is at −15° relative to the vertical axis, and the angle of peak reflected light is approximately 15° relative to the vertical axis. In the middle diagram, the surface normal is parallel to the vertical axis, and the angle of peak reflected light is approximately 45° relative to the vertical axis. In the bottom diagram, the surface normal is at +15° relative to the vertical axis, and the angle of peak reflected light is approximately 75° relative to the vertical axis.

Setting aside the geometric property of the surface normal, each of the ways in which a surface can interacts with light can be described as a different channel of a material property that is associated with the surface, or with a material comprised in the surface.

As mentioned above, the previous approach to trying to avoid the 'uncanny valley' effect has been to obtain very large amounts of data about how light interacts with an object, as a brute force way of accurately modelling the object. Instead, the inventors propose to determine the material property of surfaces of the object, and to adopt a more systematic approach of producing a 3D model based on the underlying material property and the underlying physics of light interactions, using conventional techniques which are known for 3D modelling of purely virtual objects for which a material property has been specified manually.

It is well-known to measure some channels of the material property, such as colour, by conventional means. However, measuring other channels of the material property, such as specular reflection intensity, roughness, sub-surface scattering and diffuse light intensity, is more difficult. More specifically, for a surface of any complexity, sensed light may come from different points on the object surface, and the spatial distribution of the light is dependent upon many channels of the material property at different points on the object surface. Furthermore, if transmission characteristics of surfaces of the object, such as transparency and index of refraction, are considered as channels of the material property, then determining the underlying material property that produces a distribution of sensed light becomes even more complex. Yet further, channels of the material property may be anisotropic, increasing complexity again.

Figure 3:
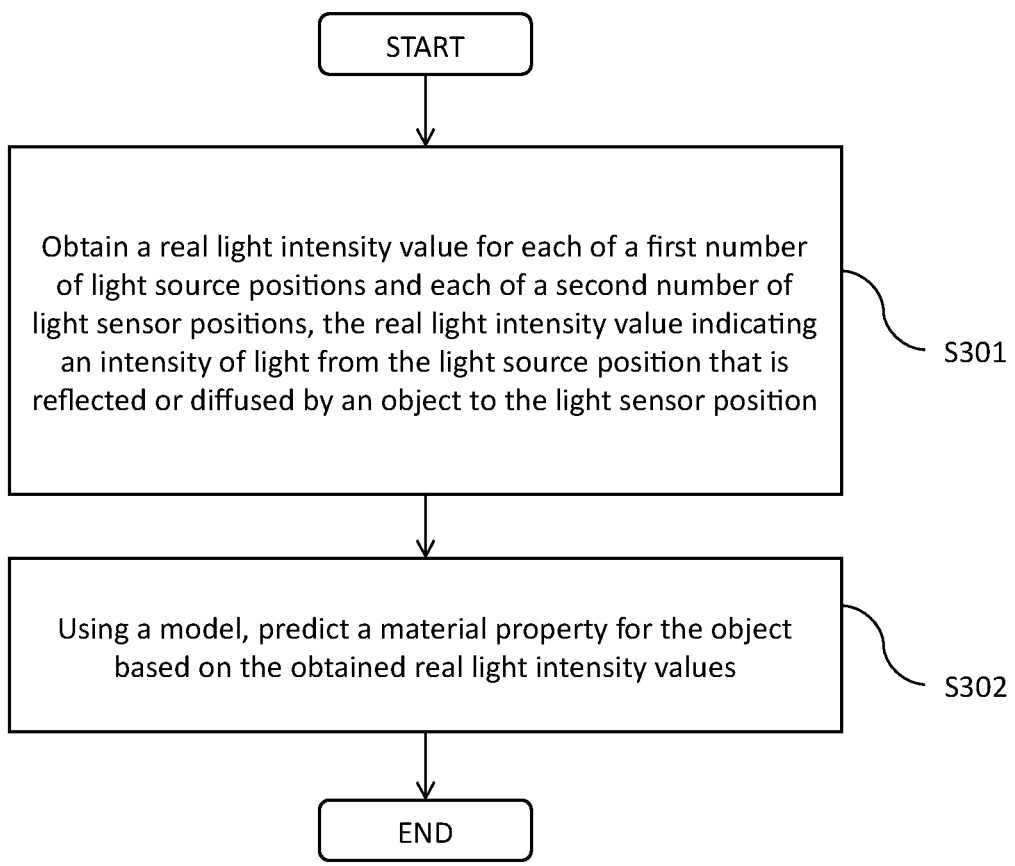
FIG. 3 is a flowchart schematically illustrating a method of determining a material property of an object.

As a solution to the problem of providing a way of generating a three-dimensional model of an object, with high realism, but from a relatively small dataset, the present inventors have devised a method as schematically shown in FIG. 3.

Referring to FIG. 3, at Step S301, a real light intensity value is obtained for each of a first number of light source positions and each of a second number of light sensor positions. The real light intensity value indicates an intensity of light from the light source position that is reflected or diffused by an object to the light sensor position. Herein, we describe "real" light intensity values in order to distinguish from simulated light intensity values. In other words, at Step S301, the real, physical object is subjected to reflection and/or diffusion measurements from each of the respective positions of a light source and a light sensor. The real light intensity values may be obtained from a physical scanning system as described above and shown in FIG. 1. The real light intensity values may, for example, take the form of RGB values with a scalar relative intensity value for each of a red, green and blue component of sensed light.

In this embodiment, it is assumed that the real light intensity values contain only light from a single source and contain no background light. However, in other embodiments, the light sensor may be exposed to a known level of background light or a known distribution of background light, which can be eliminated from the real light intensity value. For example, a dark measurement may be performed at a light sensor with no light sources active, in order to measure background light. Additionally, in other embodiments, a real light intensity value at a light sensor position may be measured while two or more light sources are active at two or more respective light source positions.

In this embodiment, the real light intensity values are stored in association with a light source position and a light sensor position.

At step S302, a material property is predicted for the object, using a model that has been trained by machine learning, based on the obtained real light intensity values.

The model is trained to receive the real light intensity values as inputs and to give a predicted material property as the output. The model may be trained to predict only one channel of the material property, such as roughness, or a plurality of channels of the material property, such as roughness and specular reflection. More generally, the model may be trained to predict any combination of channels of a material property. Depending on the context in which the invention is to be applied, not all channels may be relevant. For example, in an application where it can be assumed that the object is opaque, it is not necessary to include transparency or index of refraction in the model.

Once the material property has been predicted for the object, a three-dimensional model of the object may be virtually generated using the predicted material property. Because this 3D model is based on predictions of the underlying material properties of surfaces, rather than being based purely on image data as in conventional methods of representing a real-world object, the 3D model reacts realistically when illuminated and/or viewed from the limited number of angles which were not sampled from the actual real-world object. This means that the 3D model of the object can appear highly realistic even from a relatively small dataset of real image data about the object.

Figure 4:
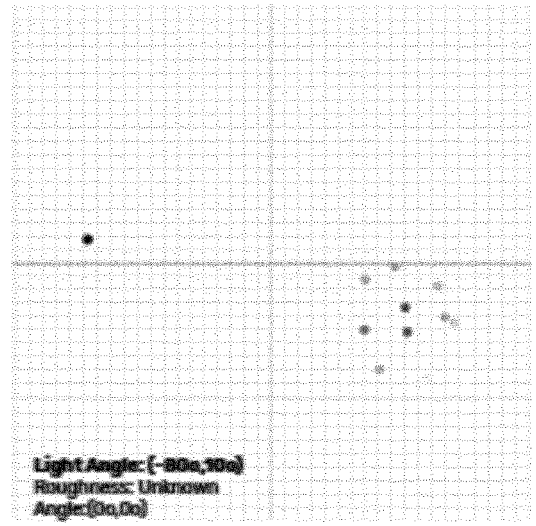
FIG. 4 schematically illustrates what is required in prediction of material properties.
Figure 4:
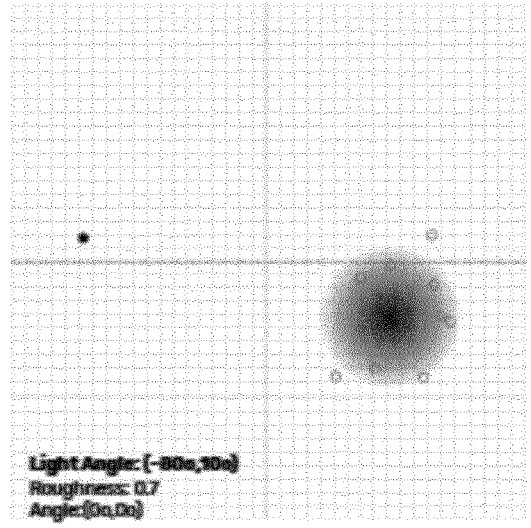
Figure 4:
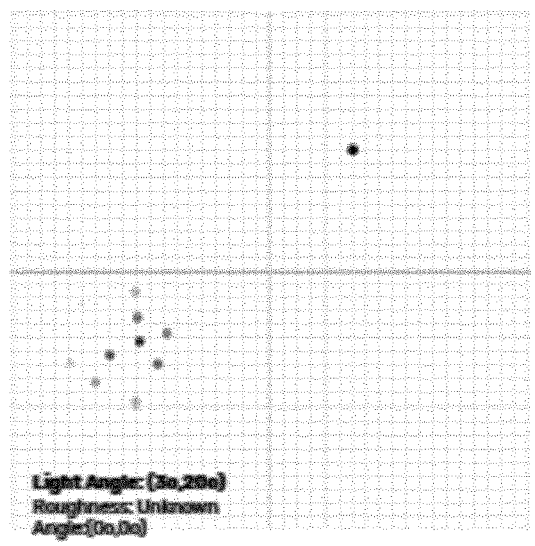
Figure 4:
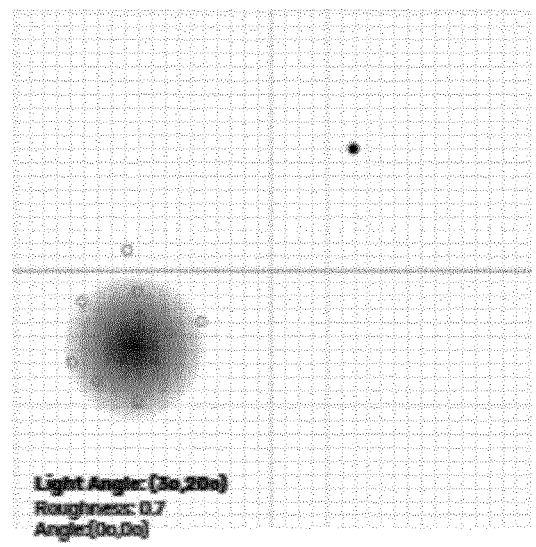

FIG. 4 provides two examples to illustrate what is required when predicting a material property based on real light intensity values.

FIGS. 4A and 4C each illustrate a 2D mapping of light source and sensor positions around an object in 3D space. In FIG. 4A, light intensity of a light source located at a solid angle of (−80°, 10°) is shown in the upper left quadrant, and real light intensity values obtained for light sensor positions are shown in the lower right quadrant. In FIG. 4C, light intensity of a light source located at a solid angle of (3°, 20°) is shown in the upper right quadrant, and real light intensity values obtained for light sensor positions are shown in the lower left quadrant. In each of FIGS. 4A and 4C, for the purposes of this example, the roughness of the object is unknown, but it is known that the surface of the object coincides with the plane of the diagram (represented with surface normal having a solid angle (0°, 0°)).

FIGS. 4B and 4D illustrates the underlying light distributions produced by the object, for the given light source position. This can be virtually simulated when the material property and geometry of the object surface are known. The model must be capable of predicting the material property (in this case, a relative roughness of 0.7) based only on the samples shown in FIG. 4A and FIG. 4C. With only a finite number of light sources and light sensors, the real light intensity values provide only sparse data, and the model must be able to effectively match this to a smooth distribution resulting from the material property of the object.

Figure 5:
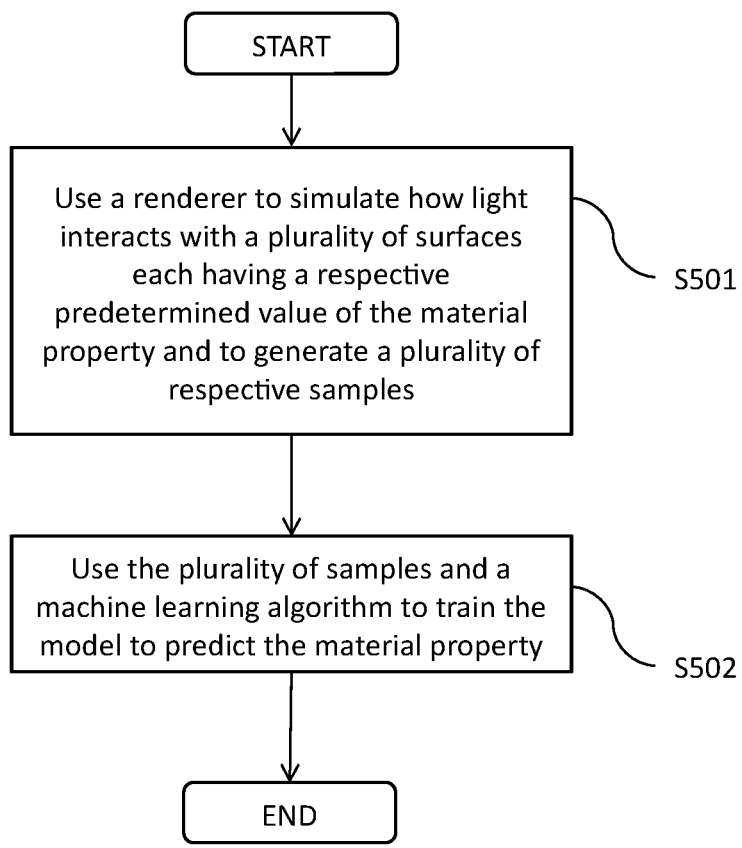
FIG. 5 is a flowchart schematically illustrating a method of training a model for predicting a material property.

FIG. 5 is a flowchart schematically illustrating a method of training a model for predicting a material property, such as the model used in the method of FIG. 3. The method for training the model may be performed separately from the method using the model. For example, the method for training the model may be performed by a first processing apparatus, and the trained model may be transferred or copied to a second processing apparatus which performs a method using the model.

At step S501, a renderer is used to simulate how light interacts with a plurality of surfaces each having a respective predetermined value of the material property.

In this embodiment, each surface has the same geometry, which may be a spherical or flat geometry. In other embodiments, each surface may have a respective randomly chosen geometry.

The material property is represented by one or more numerical values each corresponding to a channel of the material property. For example, each channel may be represented by a relative value ranging from 0 to 1 or 0% to 100%. Additionally, each channel may be associated with multiple numerical values, for example values for each of three spatial dimensions in the case that the channel is anisotropic, or, in the case of colour, red, green and blue values.

Predetermined values of the material property may be chosen to define a range of samples across each channel. The predetermined values may be random in one channel, multiple channels or all channels of the material property.

Once the geometry and predetermined material property of each surface are defined, conventional techniques can be used to simulate the surface as a purely virtual object.

Additionally, at step S501, the renderer is used to generate a plurality of respective samples, wherein each sample comprises the predetermined value of the material property and a simulated light intensity value for each of a plurality of sample light source positions and sample light sensor positions relative to the surface, the simulated light intensity value indicating an intensity of light from the light source position that is reflected or diffused by the surface to the light sensor position.

In other words, the simulation of how light interacts with each surface corresponds virtually to step S301 of obtaining real light intensity values for a real object. The resulting sample for a surface includes the simulated light intensity values, representing how the light interacted, together with a ground truth comprising the material property used for the simulation.

At step S502, the plurality of samples are used with a machine learning algorithm to train the model to predict the material property when given a light intensity value for each of a first threshold number of light source positions and a second threshold number of light sensor positions.

The first number of light source positions for obtaining real light intensity values, as in step S301, is greater than or equal to the first threshold number of light source positions achieved for the model in step S502. Similarly, the second number of light sensor positions for obtaining real light intensity values, as in step S301, is greater than or equal to the second threshold number of light sensor positions achieved for the model in step S502. In other words, the first and second threshold numbers indicate a minimum amount of real information required for the model to successfully predict the material property of an object. Here, "successfully" can be defined in terms of how close the predicted material property should be to the real material property of the object, and how high the probability is that this closeness is achieved by the model. Accordingly, depending on the context and the required level of precision, the model can be trained with more or less sample data.

The model may take the form of a neural network configured to receive light intensity values, and their associated light source positions and light sensor positions, as an input layer, and to produce a representation of the material property, as an output layer.

The machine learning algorithm may, for example, take the form of a generative adversarial network, where the discriminator of the generative adversarial network is trained to be the model.

Figure 6:
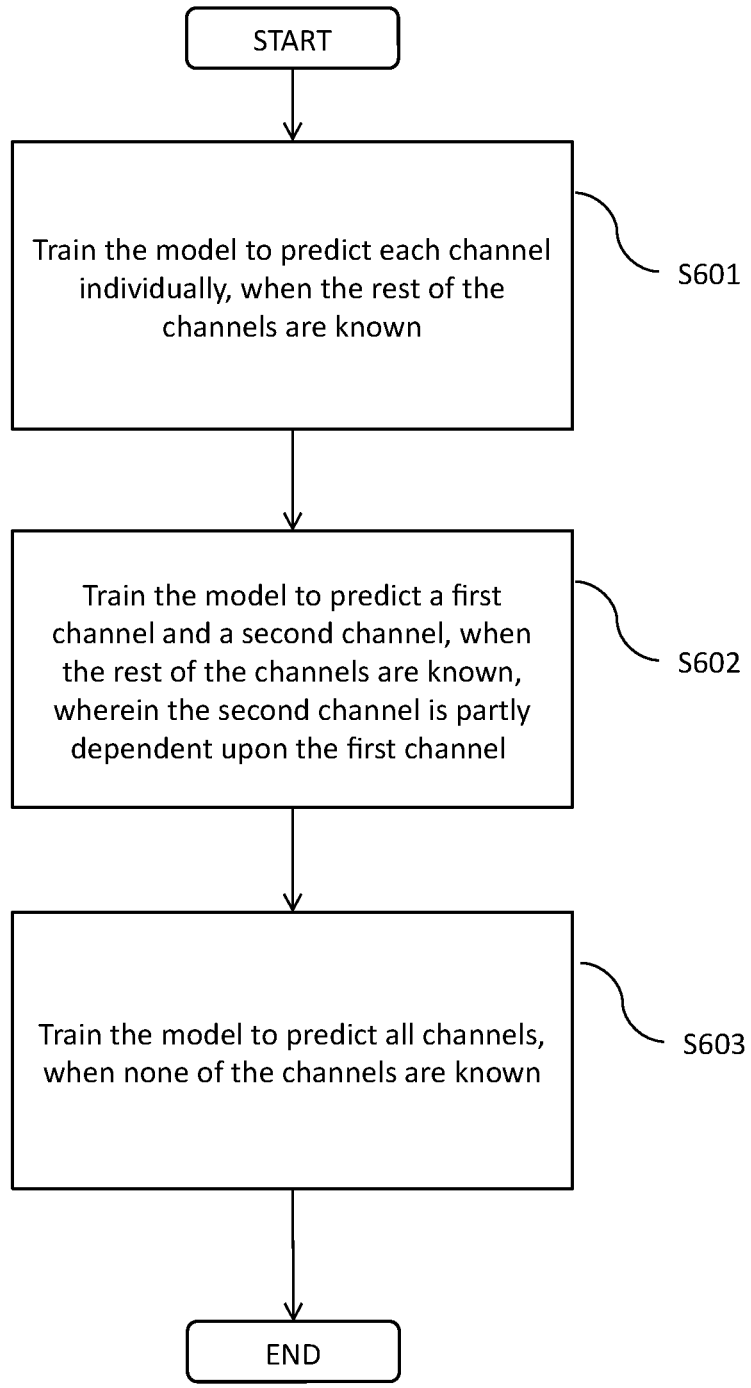
FIG. 6 is a flowchart schematically illustrating stages of training a model for predicting a material property.

In order to stabilise the training, training the model may comprise multiple stages as schematically illustrated using a flowchart in FIG. 6.

For example, in the case that the material property is represented with more than one channel, i.e. the material property comprises a plurality of channels, training may comprise a stage S601 of training the model to predict each of the plurality of channels individually.

In order to do this, the model may be trained with samples as generated in step S501, where the model is provided with the simulated light intensity values of the sample and with the channels of the material property other than an individual channel for which the model is currently being trained. This method allows training prediction of a single channel at a time, while also training prediction of that channel across a diverse range of material properties.

Alternatively, the model may be trained with samples as generated in step S501, wherein the material property is the same for all of the samples in the channels other than an individual channel for which the model is currently being trained. This alternative simplifies training of a single channel, but is more susceptible to systematic bias.

Once the model has been trained to predict each of the channels individually, at step S603, the model is then trained to predict all of the plurality of channels which are defined for the material property. (As mentioned above, this may not be all possible channels, because some channels may be excluded from the model if they are not relevant to a particular application of the invention). At this stage of training, the material property data is entirely excluded when the samples are provided to train the model. The samples used in step S603 may be generated for a material property which is entirely randomly selected for all channels.

An additional stage may be useful in some cases, where the material property is represented with more than two channels, and the channels are not entirely independent. At stage S602, after training the model to predict single channels and before training the model to predict all channels, the model may be trained to predict a pair of channels where one channel is dependent upon the other channel. In other words, the model may be trained to predict a first channel and a second channel, wherein the second channel is partly dependent upon the first channel.

An example of this is a material property which is represented with a channel for specular reflection intensity (i.e. the total amount of light reflected) and a channel for roughness. As previously shown in FIG. 2A, an increase in roughness increases the angular spread of reflected light. The real light intensity value at each position depends on both the roughness and the specular reflection intensity, because increased specular reflection intensity increases all real light intensity values that include any reflected light, while increased roughness increases real light intensity values that are further from the peak of the reflected light distribution. As a result, predictions for the roughness channel are dependent upon what has been predicted in the specular reflection intensity channel.

At stage S602, semi-supervised learning can be performed to train the model on any correlation or anti-correlation between channels, in order to better prepare the model for being trained on samples for entirely random material property values.

In other embodiments, the model may be trained in a single stage to predict all channels of the material property. In other words, step S603 is performed immediately without performing step S601 or S602. This single stage training may, for example, be used where the material property only includes channels which are known to be entirely independent from each other, and thus there is a reduced risk of instability when training prediction of all channels simultaneously.

Furthermore, in other embodiments, the model may be trained to predict an orientation of the surface based on the real light intensity values. In other words, the model may be trained to predict the scenario shown in FIG. 2B, where the distribution of real light intensity values is dependent upon the surface normal of the surface from which light is reflected, in addition to the material property of the surface.

This may be integrated with any of the stages S601, S602 and S603, where surface normal orientation is treated in the same way as an additional channel of the material property. For example, at stage S601, samples may be used to train prediction of the surface normal, when all channels of the material property are known and, at stage S603, the model may be trained with samples for surfaces where both the material property and the surface normal orientation are randomly chosen.

Figure 7:
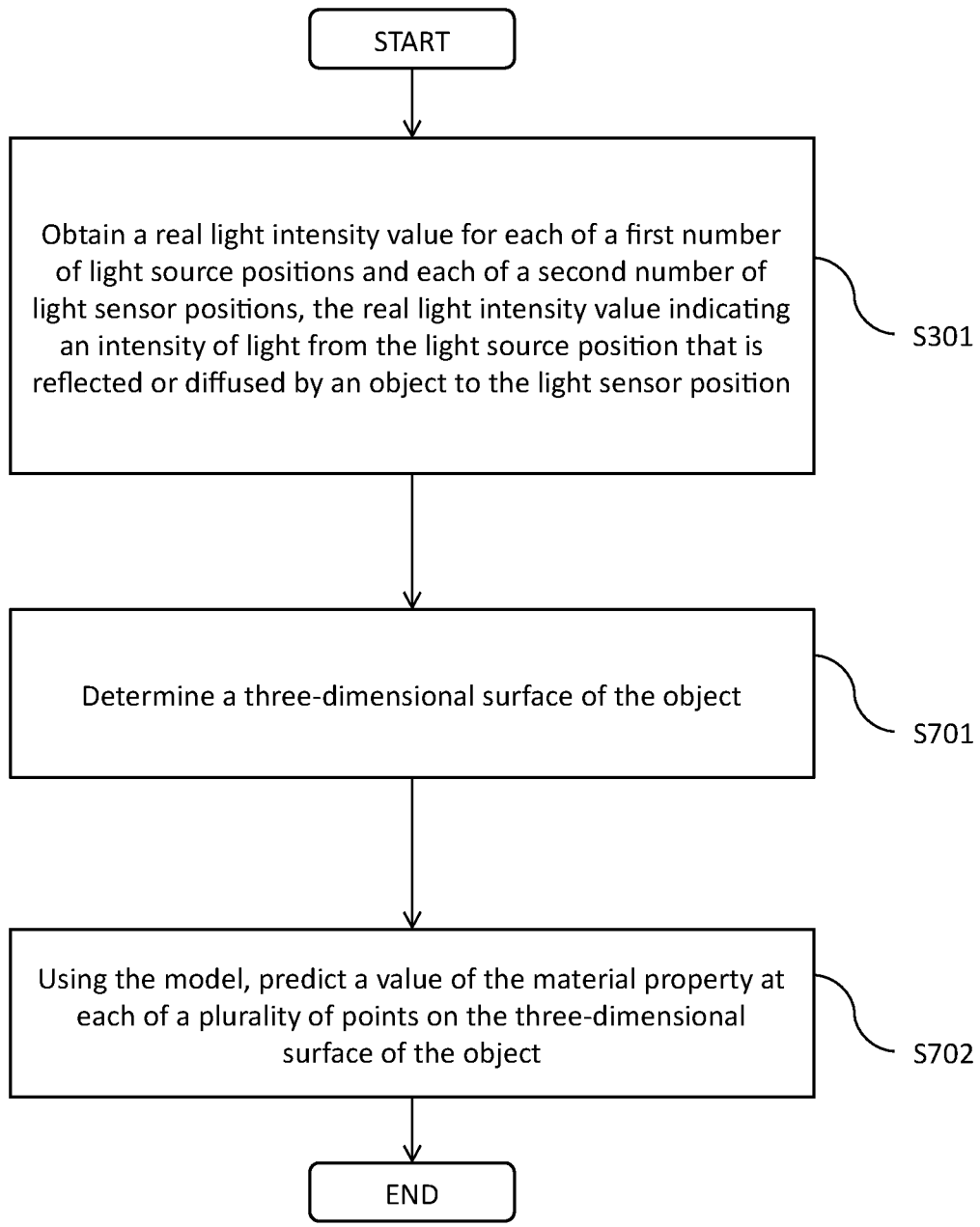
FIG. 7 is a flowchart schematically illustrating a method of determining a material property of an object.

FIG. 7 is a flowchart schematically illustrating a method of determining a material property of an object, incorporating determining geometry of the object. FIG. 7 comprises step S301 which is described above.

However, the method of FIG. 7 differs from the above-described method by the addition of step S701. At step S701, a three-dimensional surface of the object is determined.

This three-dimensional surface (the surface geometry) can be determined using conventional methods, by: taking a plurality of images of the object from multiple angles; correlating features of the object that appear in multiple images; and determining positions of the features based on the positions from which each image was recorded. The result of this method is a point cloud of points which make up the surface or surfaces of the object.

On the other hand, if the model has been trained to predict an orientation of the surface based on the real light intensity values, the three-dimensional surface of the object can be determined using the model and the obtained real light intensity values.

Furthermore, even when a point cloud has already been determined by conventional means, the model can be used to increase the precision with which the surface normal at each point of the point cloud is determined.

Additionally, the method of FIG. 7 differs from the above-described method in that, instead of predicting a material property for the object as a whole as in step S302 described above, at step S702 a value of the material property is predicted for each of a plurality of points on the three-dimensional surface of the object.

Figure 8:
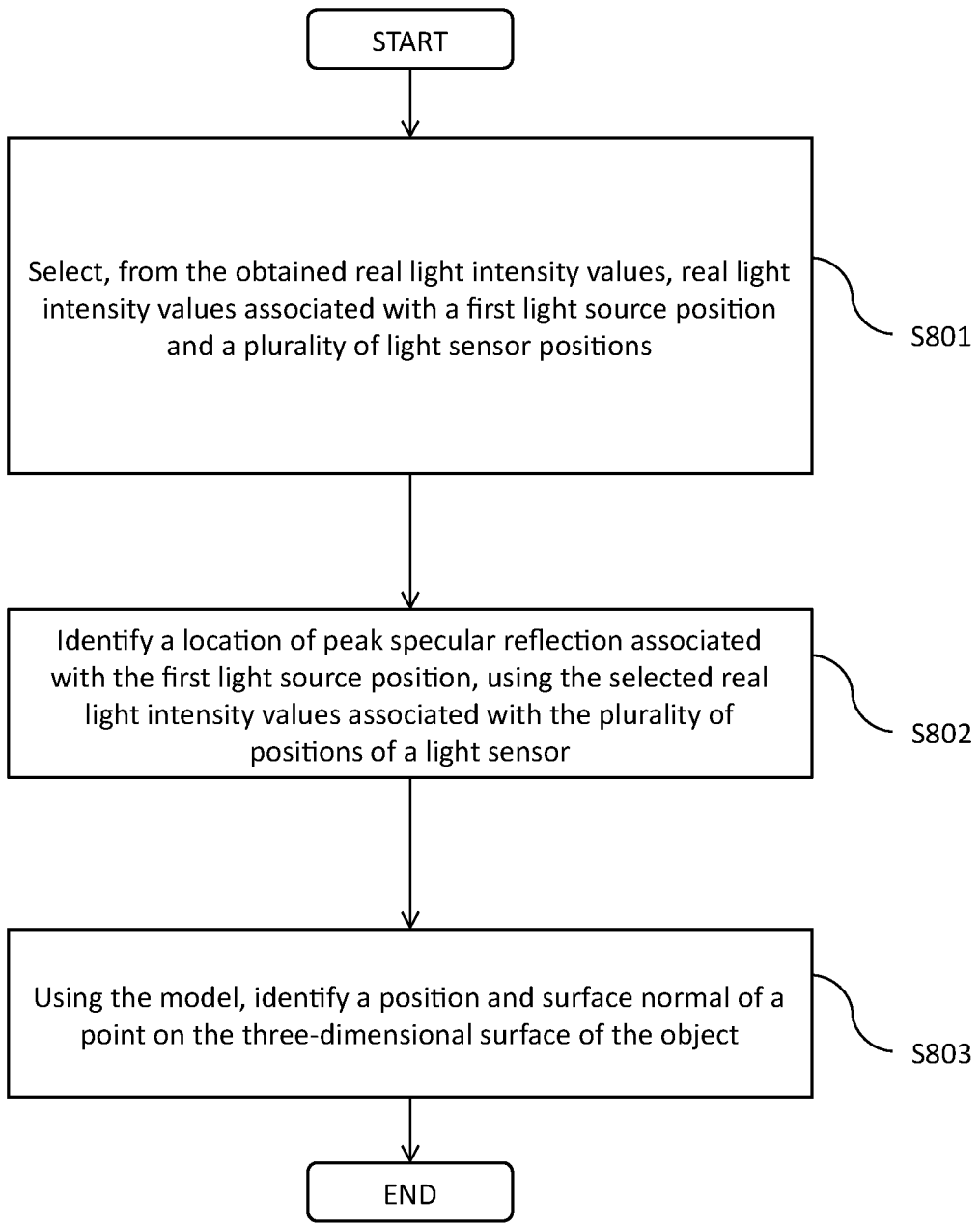
FIG. 8 is a flowchart schematically illustrating a method of determining a three-dimensional surface of an object.

FIG. 8 schematically illustrates the flow of a method according to one embodiment, in which use of the model is combined with a procedural algorithm when performing step S701 of determining the three-dimensional surface of the object.

At step S801, real light intensity values associated with a first light source position are selected from the values obtained in step S301. The selected real light intensity values are associated with a plurality of light sensor positions that received light reflected off the object from the first light source position.

At step S802, a location of peak specular reflection associated with the first light source position is identified using the selected real light intensity values.

At step S803, the model is used to identify a position and surface normal of a point on the three-dimensional surface of the object. This point is a point which would be capable of giving peak specular reflection at the location identified in step S802 when illuminated by the first light source position used in step S801. In step S803, the model may receive, as inputs, the selected real light intensity values, the first light source position, and the identified location of peak specular reflection, and may predict a position and surface normal as an output.

In other embodiments, the model may be used to determine the three-dimensional surface of the object directly from the obtained real light intensity values and the corresponding light source positions and light sensor positions, without first identifying a location of peak specular reflection. In such embodiments, steps S701 and S702 may be performed simultaneously. More specifically, the model be trained to receive a complete set of obtained real light intensity values for the first number of light sensor positions and the second number of light sensor positions as an input, and to output a plurality of points each having a position, surface normal orientation and material property. In such an embodiment, the plurality of points define both the three-dimensional surface of the object and the material property associated with each point.

The above described methods can be significantly simplified if diffuse light can be separated from reflected light, before light intensity values are considered by the model. As mentioned above, diffuse light differs from reflected light in that polarisation is preserved between incidence and reflection of light, but diffuse light has random polarisation.

Figure 9A:
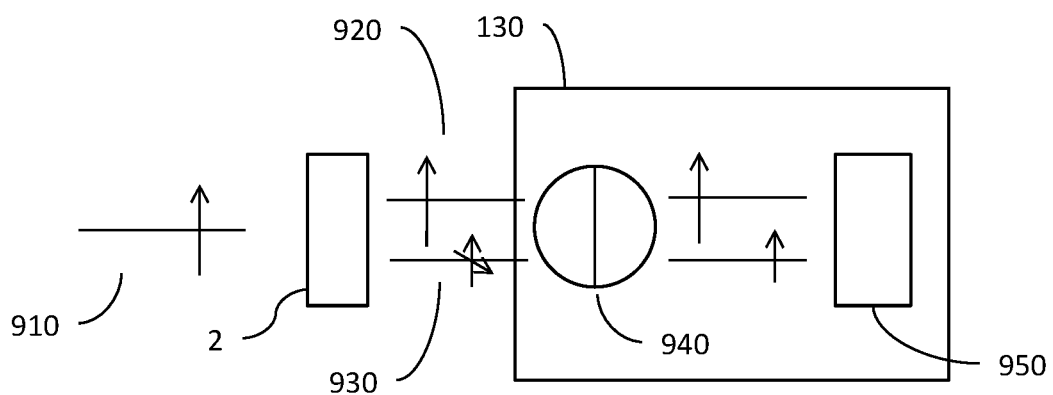
FIGS. 9A and 9B are schematic illustrations of polarised specular reflection and non-polarised diffuse reflection.
Figure 9B:
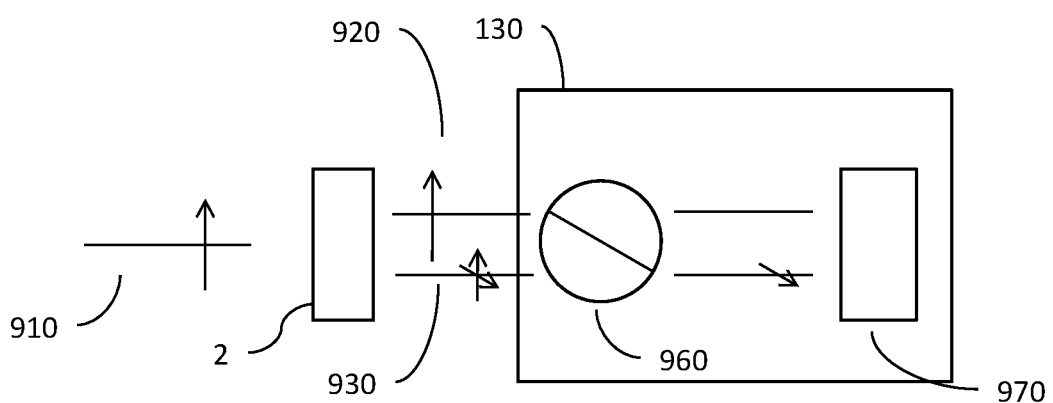

FIGS. 9A and 9B schematically illustrate a light sensor 130 adapted to make use of the different polarisations of reflected light and diffuse light, in embodiments where each light source 120 is a polarised light source. The light sensor 130 may be part of a physical scanning system as shown in FIG. 1, or may be a single light sensor that can be used with a single light source, both of which are moved around the object 2.

As shown in FIGS. 9A and 9B, incident light 910 interacts with the object 2 to produce reflected light 920 and diffuse light 930. The incident light 910 is linearly polarised, the reflected light 920 has the same polarisation as the incident light, and the diffuse light 930 is non-polarised. Each polarisation is indicated using an arrow, where non-polarised light has equal arrows in different directions.

In FIG. 9A, the light sensor 130 comprises a sensor polarisation filter 940 and a light sensing element 950. The sensor polarisation filter 940 is oriented to pass the same polarisation as the reflected light 920, which passes through the filter unchanged. As the diffuse light 930 passes through the sensor polarisation filter 940, its component with a polarisation orthogonal to the reflected light 920 is filtered. Thus the light sensed by the light sensing element 950 comprises the reflected light 920 and half of the diffuse light 930.

In FIG. 9B, the light sensor 130 comprises a sensor polarisation filter 960 and a light sensing element 970. The sensor polarisation filter 960 is oriented to pass a polarisation orthogonal to the reflected light 920, which does not pass through the filter. As the diffuse light 930 passes through the sensor polarisation filter 960, its component with a polarisation parallel to the reflected light 920 is filtered. Thus the light sensed by the light sensing element 970 comprises half of the diffuse light 930.

A polarised light source 120 may be similarly provided using a non-polarised light source and a source polarisation filter.

In a first example of the invention using polarisation, in a physical scanning system as shown in FIG. 1, each of the light sensors 130 comprises a sensor polarisation filter 940 with a first polarisation, and each of the light sensors is configured to obtain a reflected light intensity value using the sensor polarisation filter, as shown in FIG. 9A. In order to maximally sense polarised reflected light, the first polarisation of each sensor polarisation filter 940 is aligned with a polarisation of the light source 120 for which a real light intensity value is currently being obtained.

In this example, each polarised light source 120 is a linearly polarised light source, and each sensor polarisation filter 940 is a linear polarisation filter. However, other types of polarisation, such as circular polarisation, may be used to distinguish polarised reflected light from non-polarised diffuse light.

With such a polarised light source and polarised light sensor, a real light intensity value can be obtained which substantially suppresses diffuse light. With such real light intensity values, many channels of the material property which depend on specular reflection can be predicted more easily, and a 3D model can be generated which realistically imitates many ways in which the original object interacts with light.

However, if each light sensor 130 is only capable of sensing one polarisation, then the sensor polarisation filter 940 of each light sensor 130 must be re-aligned to sense light from each light source 120, so that the polarisation of the currently-sensed light source 120 is aligned with the sensor polarisation filter 940.

In a preferred embodiment, each of the light sensors 130 is further configured to obtain a light intensity value for an orthogonal polarisation, as shown in FIG. 9B. More specifically, the light sensor 130 is further configured to obtain a diffused light intensity value by sensing a polarisation orthogonal to the first polarisation.

For example, each of the light sensors may comprise a first light sensing pixel 950 behind the sensor polarisation filter 940, and a second light sensing pixel 970 behind a second sensor polarisation filter 960 that passes a polarisation that is orthogonal to (or even simply different from) the sensor polarisation filter 940.

Alternatively, each of the light sensors 130 may comprise an actuator for adjusting a position of the sensor polarisation filter 940. The sensor polarisation filter may be moved between the first polarisation (as illustrated in FIG. 9A) and the different polarisation (as illustrated in FIG. 9B) to obtain two values of light intensity for different polarisations.

As an alternative to obtaining a second polarised light intensity value with a different polarisation, each light sensor 130 may be further configured to obtain a total light intensity value without using the sensor polarisation filter. The light sensor 130 may comprise a first light sensing pixel 950 and a sensor polarisation filter 940 (as shown in FIG. 9A) and may further comprise a second light sensing pixel 970 arranged to receive incident light which does not pass through the sensor polarisation filter 940. Alternatively, the light sensor 130 may comprise an actuator configured to move the sensor polarisation filter 940, and may be configured to obtain a first real light intensity value at light sensing element 950 when the sensor polarisation filter 940 is in the path of light incident and obtain a second real light intensity value at light sensing element 950 when the sensor polarisation filter 940 is not in the path of incident light.

By comparing the values obtained at the two pixels 950, 970, or the two values obtained at the single light sensing element 950, real light intensity values can be obtained for light of two orthogonal polarisations, and for non-polarised light. By taking linear combinations of the two readings, light intensity values may be obtained for other polarisations which are linear combinations of the two measured polarisations. For example, if linear polarisation is used, the two readings can be used to determine the intensity of light received at a sensor with any linear polarisation orientation.

Similarly to the above-described alternative configurations of a light sensor 130, the polarisation of each of the light sources 120 may by controlled using a linear combination of two polarised light source elements with orthogonal (or simply different) polarisations. By a linear combination, it is meant that the intensity of each of the two polarised light source elements may be individually controlled, and light from the two light source elements is combined as a single output from the light source 120.

Alternatively, the light source 120 may comprise an actuator configured to move a source polarisation filter to control polarisation of a single light source element.

As a further preferred feature, each light sensor may be configured to obtain an independent measurement of reflected light from each light source. This may be provided by configuring the sensor polarisation filter 940 of each light sensor 130 to filter a polarisation that is different from all other light sensors 130. For example, in a system with 18 light sensors 130, the n-th sensor polarisation filter 940 of each light sensor 130 may be configured to pass light with a first polarisation of $10n$ degrees.

Each light source 120 may be correspondingly configured to produce with light at different times with different polarisations, in order to obtain a reflected light intensity value at each light sensor 130. In other words, each of the light sources 120 may comprise an adjustable source polarisation filter. This may be achieved using the above-described configurations for controlling the polarisation of the light source.

With this feature, a physical scanning system as shown in FIG. 1 may be configured to obtain a polarised light intensity value for a particular combination of a light source 120 and a light sensor 130 by adjusting the adjustable source polarisation filter of the light source to transmit light with a polarisation corresponding to the sensor polarisation filter 940 of the light sensor 130.

Figure 10:
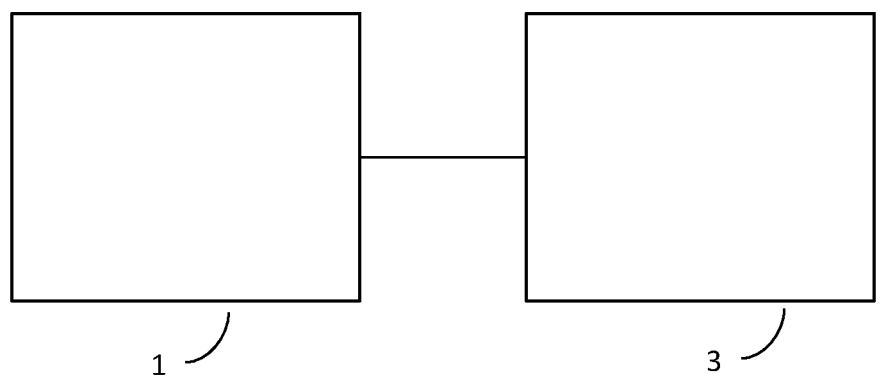
FIG. 10 is a schematic illustration of a system for determining a material property of an object.

FIG. 10 illustrates a system for determining a material property of an object. The system comprises a physical scanning system 1 and a processing apparatus 3.

The physical scanning system 1 is a system as described above with reference to FIG. 1 and optionally having the polarisation features described above.

The processing apparatus 3 is configured to obtain, from the physical scanning system 1, real light intensity values of light diffused or reflected by an object, in order to perform at least the method described above with reference to FIG. 3, and more generally any of the above described methods for determining a material property of an object, training a model for predicting a material property, and/or generating a three-dimensional model of an object.

Figure 11:
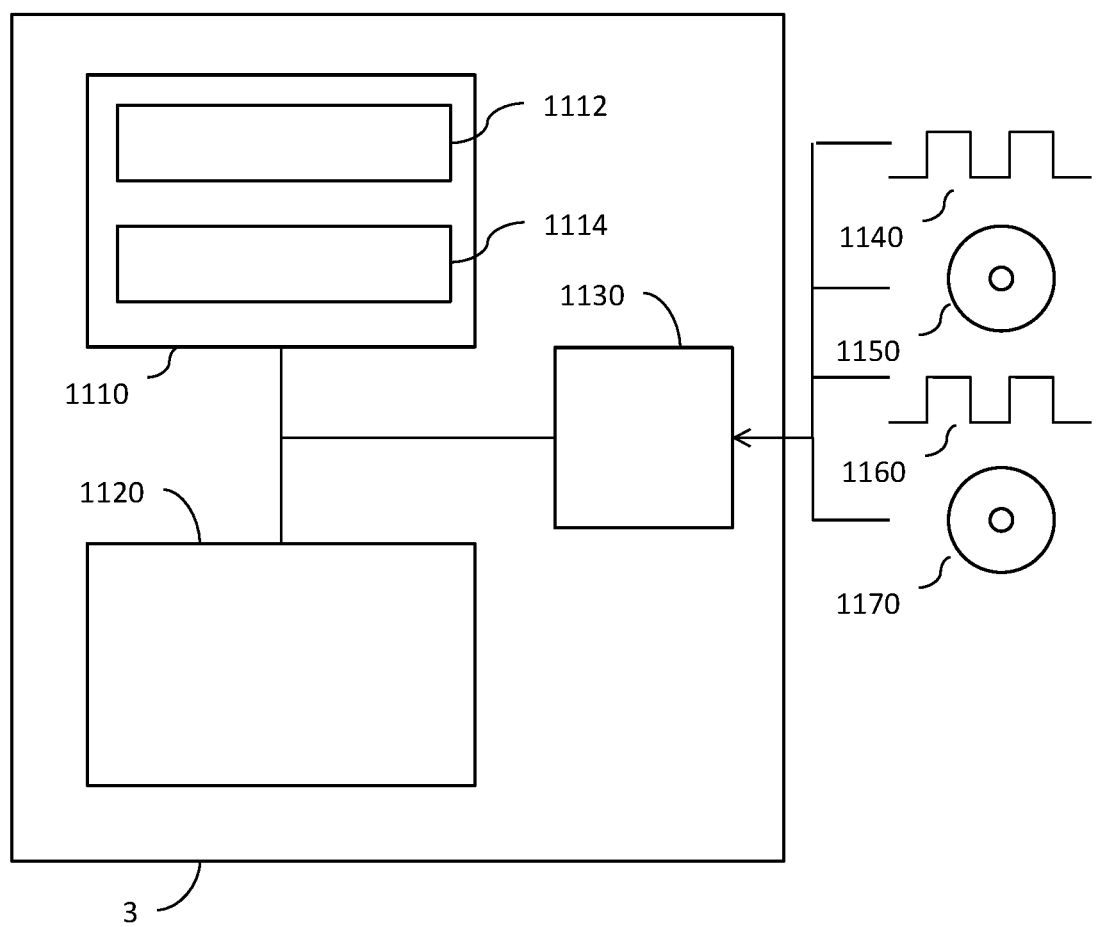
FIG. 11 is a schematic illustration of a processing apparatus configured to determine a material property of an object.

FIG. 11 illustrates an example of a processing apparatus 3. The processing apparatus comprises a memory 1110, a processor 1120 and an input/output device 1130. The memory 1110 stores processing instructions 1112 and a model 1114. When executed by the processor 1120, the processing instructions 1112 cause the processing apparatus 3 to perform a method as described above. The input/output device 1130 is configured to communicate with the physical scanning system 1. Communication with the physical scanning system 1 may be via a direct connection or via a network. The input/output device 1130 may also be configured to receive a signal 1140 (e.g. an optical signal or an electrical signal) or a non-transitory storage medium (e.g. a CD or USB flash memory) 1150 comprising the processing instructions 1112 and to copy the processing instructions 1112 into the memory 1110. The input/output device 1130 may also be configured to receive a signal 1160 or a non-transitory storage medium 1170 comprising the model 1114 and to copy the model 1114 into the memory 1110.

The above described method may also be split between multiple programs executed by multiple processing apparatuses. For example, the steps of generating a plurality of respective samples and training the model may be performed using one or more processing apparatuses with high processing capacity. Then, after the model is generated, copies of the model may be distributed on a non-transitory storage medium or in a signal. The steps of obtaining real light intensity value(s) and predicting the material property may then be performed by a processing apparatus with lower processing capacity to determine the material property of an object.

The subject-matter of the application also includes the following clauses.

1, A method of determining a material property of an object, the method comprising:
    obtaining a real light intensity value for each of a first number of light source positions and each of a second number of light sensor positions, the real light intensity value indicating an intensity of light from the light source position that is reflected or diffused by an object to the light sensor position; and
    using a model that has been trained by machine learning, predicting the material property for the object based on the obtained real light intensity values.

2. A method according to clause 1, the method further comprising:
    using a renderer to simulate how light interacts with a plurality of surfaces each having a respective predetermined value of the material property and to generate a plurality of respective samples,
    wherein each sample comprises the predetermined value of the material property and a simulated light intensity value for each of a plurality of sample light source positions and sample light sensor positions relative to the surface, the simulated light intensity value indicating an intensity of light from the light source position that is reflected or diffused by the surface to the light sensor position;
    using the plurality of samples and a machine learning algorithm to train the model to predict (S502) the material property when given a light intensity value for each of a first threshold number of light source positions and a second threshold number of light sensor positions, wherein the first number is greater than or equal to the first threshold number and the second number is greater than or equal to the second threshold number.

3. A method according to clause 2, wherein the material property comprises a plurality of channels, each channel being associated with a respective way in which a surface can interact with light, and training the model comprises:
    a first stage of training the model to predict each of the plurality of channels individually, when the rest of the channels of the material property are known; and
    a final stage of training the model to predict all of the plurality of channels, when none of the channels are known.

4. A method according to clause 3, wherein training the model further comprises:
    a second stage, between the first stage and the final stage, of training the model to predict a first channel and a second channel, when the plurality of channels other than the first and second channels are known, wherein the second channel is partly dependent upon the first channel.

5. A method according to any of clauses 2 to 4, wherein training the model comprises training the model to predict an orientation of a surface.

6. A method according to any preceding clause, further comprising:
    determining a three-dimensional surface of the object; and
    for each of a plurality of points on the three-dimensional surface of the object, predicting a value of the material property at the point.

7. A method according to clause 6, wherein determining the three-dimensional surface of the object is performed using the model and the obtained real light intensity values.

8. A method according to clause 7, wherein determining a three-dimensional surface of the object comprises, for a first light source position:
    selecting, from the obtained real light intensity values, real light intensity values associated with the first light source position and a plurality of light sensor positions;
    identifying a location of peak specular reflection associated with the first light source position, using the selected real light intensity values associated with the plurality of positions of a light sensor; and
    using the model to identify a position and surface normal of a point on the three-dimensional surface of the object.

9. A method according to any preceding clause, further comprising generating a three-dimensional model of the object, using the predicted material property.

10. A method according to any preceding clause, wherein the material property comprises one or more of: specular reflection; roughness; diffuse light emission; sub-surface scattering; transparency; and index of refraction.

11. A physical scanning system comprising:
    a housing for receiving an object to be scanned;
    a light source at each of a plurality of light source positions around the housing; and
    a light sensor at each of a plurality of light sensor positions around the housing.

12. A system according to clause 11, wherein the light sources are polarised light sources, each of the light sensors comprises a sensor polarisation filter with a first polarisation, and each of the light sensors is configured to obtain a reflected light intensity value using the sensor polarisation filter.

13. A system according to clause 12, wherein each of the light sensors is further configured to:
    obtain a diffused light intensity value by sensing a second polarisation different from the first polarisation, or
    obtain a total light intensity value without using the sensor polarisation filter.

14. A system according to clause 12 or clause 13, wherein:
    the sensor polarisation filter of each light sensor is configured to filter a polarisation that is different from the other light sensors, the polarised light sources each comprise an adjustable source polarisation filter, and
    the physical scanning system is configured to obtain the polarised light intensity value for a light source and a light sensor by adjusting the adjustable source polarisation filter of the light source to transmit light with a polarisation corresponding to the sensor polarisation filter of the light sensor.

15. A system comprising a processing apparatus configured to perform a method according to any of clauses 1 to 10 and a physical scanning system according to any of clauses 11 to 14.

The invention claimed is:

1. A method of determining a material property of an object, the method comprising:
   obtaining a real light intensity value for each of a first number of light source positions and each of a second number of light sensor positions, the real light intensity value indicating an intensity of light from the light source position that is reflected or diffused by an object to the light sensor position;
   determining a three-dimensional surface of the object; and
   for each of a plurality of points on the three-dimensional surface of the object, using a model that has been trained by machine learning, predicting the material property for the object at the point based on the obtained real light intensity values,
   wherein the material property comprises one or more of: specular reflection, roughness, diffuse light emission, sub-surface scattering, transparency, and index of refraction, and
   wherein the model is a neural network configured to receive light intensity values, and their associated light source positions and light sensor positions, as an input layer, and to produce a representation of the material property, as an output layer.

2. The method according to claim 1, the method further comprising:
   using a renderer to simulate how light interacts with a plurality of surfaces each having a respective predetermined value of the material property and to generate a plurality of respective samples,
   wherein each sample comprises the predetermined value of the material property and a simulated light intensity value for each of a plurality of sample light source positions and sample light sensor positions relative to the surface, the simulated light intensity value indicating an intensity of light from the light source position that is reflected or diffused by the surface to the light sensor position; and
   using the plurality of samples and a machine learning algorithm to train the model to predict the material property when given a light intensity value for each of a first threshold number of light source positions and a second threshold number of light sensor positions, wherein the first number is greater than or equal to the first threshold number and the second number is greater than or equal to the second threshold number.

3. The method according to claim 2, wherein the material property comprises a plurality of channels, each channel being associated with a respective way in which a surface can interact with light, and training the model comprises:
   a first stage of training the model to predict each of the plurality of channels individually, when the rest of the channels of the material property are known; and
   a final stage of training the model to predict all of the plurality of channels, when none of the channels are known.

4. The method according to claim 3, wherein training the model further comprises:
   a second stage, between the first stage and the final stage, of training the model to predict a first channel and a second channel, when the plurality of channels other than the first and second channels are known, wherein the second channel is partly dependent upon the first channel.

5. The method according to claim 2, wherein training the model comprises training the model to predict an orientation of a surface.

6. The method according to claim 1, wherein determining the three-dimensional surface of the object is performed using the model and the obtained real light intensity values.

7. The method according to claim 6, wherein determining a three-dimensional surface of the object comprises, for a first light source position:
   selecting, from the obtained real light intensity values, real light intensity values associated with the first light source position and a plurality of light sensor positions;
   identifying a location of peak specular reflection associated with the first light source position, using the selected real light intensity values associated with the plurality of positions of a light sensor; and
   using the model to identify a position and surface normal of a point on the three-dimensional surface of the object.

8. The method according to claim 1, further comprising generating a three-dimensional model of the object, using the predicted material property.

9. A non-transitory computer program comprising instructions which, when executed by a processor, cause the processor to perform the method according to claim 1.

10. A non-transitory storage medium storing instructions which, when executed by a processor, cause the processor to perform the method according to claim 1.

11. A processing apparatus configured to perform the method according to claim 1.

12. The system comprising a processing apparatus according to claim 11 and a physical scanning system comprising:
   a housing for receiving an object to be scanned;
   a light source at each of a plurality of light source positions around the housing; and
   a light sensor at each of a plurality of light sensor positions around the housing.

13. The system according to claim 12, wherein the light sources are polarized light sources, each of the light sensors comprises a sensor polarization filter with a first polarization, and each of the light sensors is configured to obtain a reflected light intensity value using the sensor polarization filter.

14. The system according to claim 13, wherein each of the light sensors is further configured to:
   obtain a diffused light intensity value by sensing a second polarization different from the first polarization, or
   obtain a total light intensity value without using the sensor polarization filter.

15. The system according to claim 13, wherein:
   the sensor polarization filter of each light sensor is configured to filter a polarization that is different from the other light sensors,
   the polarized light sources each comprise an adjustable source polarization filter, and
   the physical scanning system is configured to obtain the polarized light intensity value for a light source and a light sensor by adjusting the adjustable source polarization filter of the light source to transmit light with a polarization corresponding to the sensor polarization filter of the light sensor.

* * * * *